(12) United States Patent
Callies

(10) Patent No.: US 6,923,205 B2
(45) Date of Patent: Aug. 2, 2005

(54) PRESSURE REGULATOR AND SHUT-OFF VALVE

(75) Inventor: Robert E. Callies, Leigh, NE (US)

(73) Assignee: Lindsay Manufacturing Co., Lindsay, NE (US)

( * ) Notice: Subject to any disclaimer, the term of this patent is extended or adjusted under 35 U.S.C. 154(b) by 0 days.

(21) Appl. No.: 10/864,104

(22) Filed: Jun. 9, 2004

(65) Prior Publication Data

US 2004/0261859 A1 Dec. 30, 2004

Related U.S. Application Data

(60) Division of application No. 10/284,719, filed on Oct. 31, 2002, and a continuation of application No. 10/284,719, filed on Oct. 31, 2002, now Pat. No. 6,752,169.

(51) Int. Cl.$^7$ ............................................. F16K 21/36
(52) U.S. Cl. ..................................... 137/495; 137/503
(58) Field of Search ................................. 137/495, 496, 137/503

(56) References Cited

U.S. PATENT DOCUMENTS

| | | |
|---|---|---|
| 614,441 A | 11/1898 | Burnett, Jr. |
| 1,956,977 A | 5/1934 | Shawn |
| 2,322,468 A | 6/1943 | Redrup |
| 2,600,137 A | 6/1952 | Teague, Jr. |
| 3,001,535 A | 9/1961 | Mueller |
| 3,196,901 A | 7/1965 | Phillipps |
| 3,367,360 A | 2/1968 | Hickerson |
| 3,435,843 A | 4/1969 | Spencer |
| 3,583,422 A | 6/1971 | Dach et al. |
| 3,890,999 A | 6/1975 | Moskow |
| 3,945,686 A | 3/1976 | Orzel |
| 4,172,466 A | 10/1979 | Pattarini et al. |
| 4,301,831 A | * 11/1981 | Lord ........................ 137/489.5 |
| 4,915,126 A | * 4/1990 | Gyllinder .................... 137/495 |

* cited by examiner

Primary Examiner—Stephen M. Hepperle
(74) Attorney, Agent, or Firm—Hovey Williams LLP

(57) ABSTRACT

A normally closed regulator valve for controlling the pressure of flowing fluid and also for selectively fully enabling or stopping the flow. The regulator valve includes a valve housing having an inlet passage and an outlet passage connected by a flow passage with a seat surrounding the flow passage. A valve member is movable toward and away from contact with the seat. A control housing is attached to the valve housing. An elongated rod connected at one end to the valve member has an opposite end extending into the control housing. A rod partition, which may take the form of a rigid piston or a flexible diaphragm, is connected to the opposite end of the elongated rod and is movable in the control housing in sealing relation with the walls thereof. A compression spring is provided to bias the rod partition and the valve member in directions either toward or away from sealing engagement with the flow passage seat. An auxiliary partition, which may take the form of a rigid piston or a flexible diaphragm, is positioned in the control housing on the side of the rod partition away from the seat. A spacer is engageable with the rod partition to maintain a minimum spacing between the rod partition and the auxiliary partition. Alternately, a cup-shaped member with an integral spacer could be on the rod partition. First and second ports and a vent port are formed in the control housing and can be alternately connected by conduits to deliver pressure to move the valve member toward or away from the valve seat. A solenoid operated control valve or similar device is positioned in the conduit leading from the inlet passage for controlling the flow of fluid in this conduit.

28 Claims, 6 Drawing Sheets

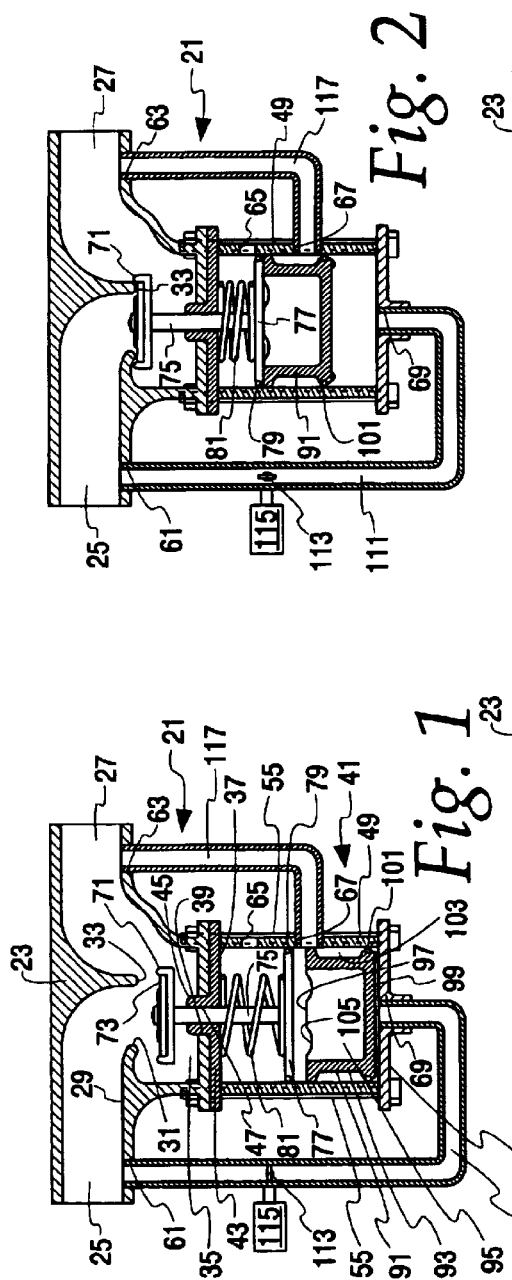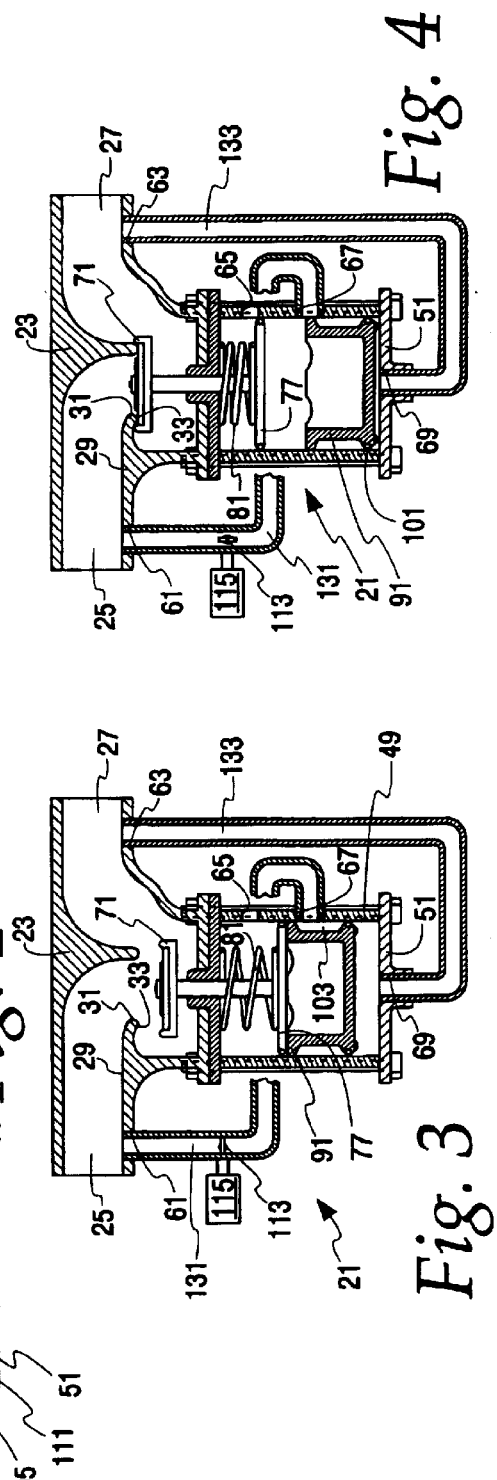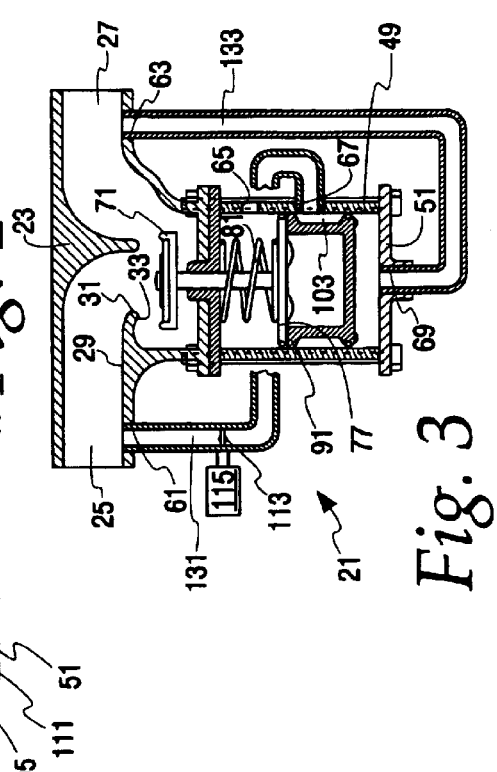

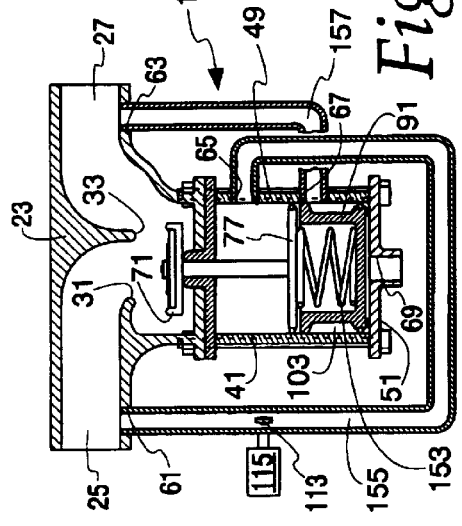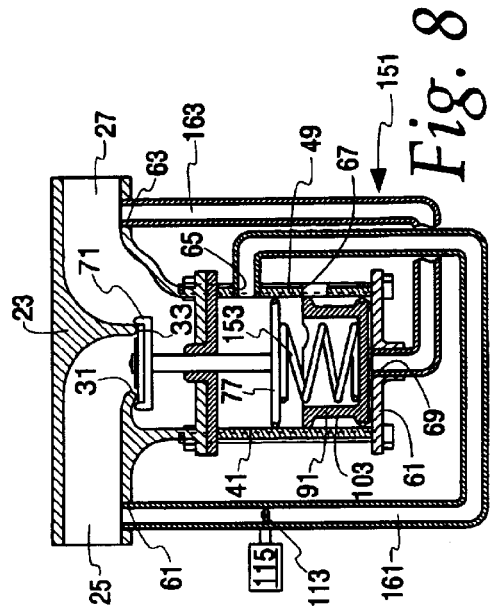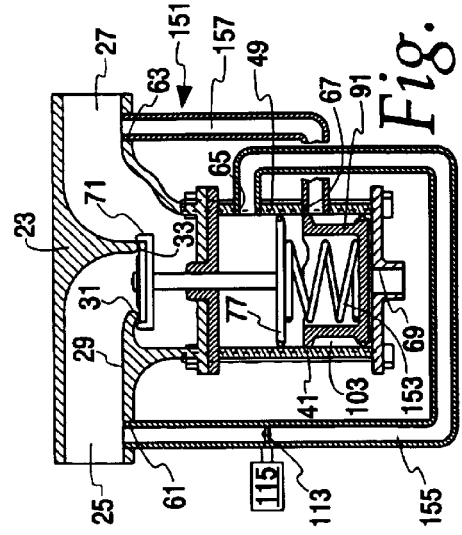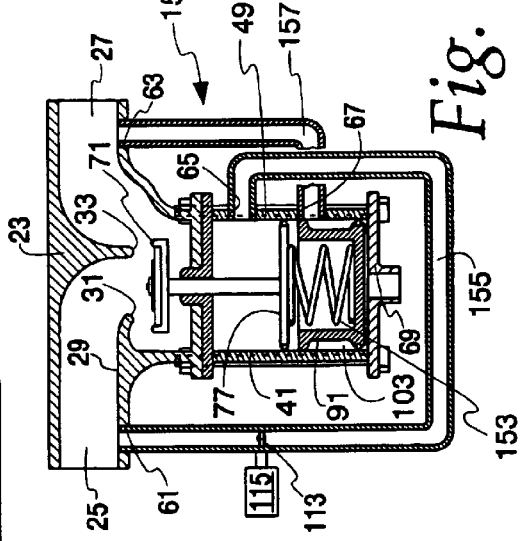

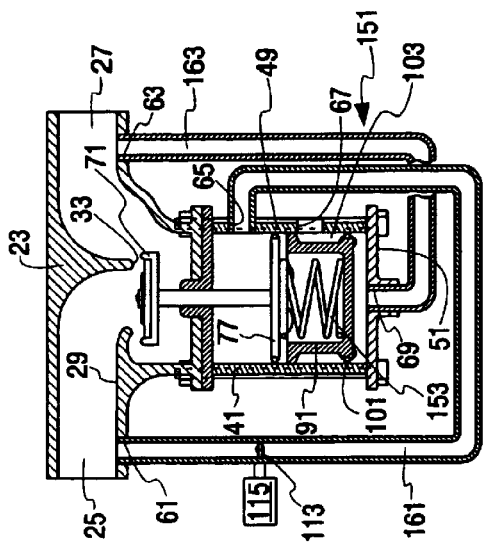
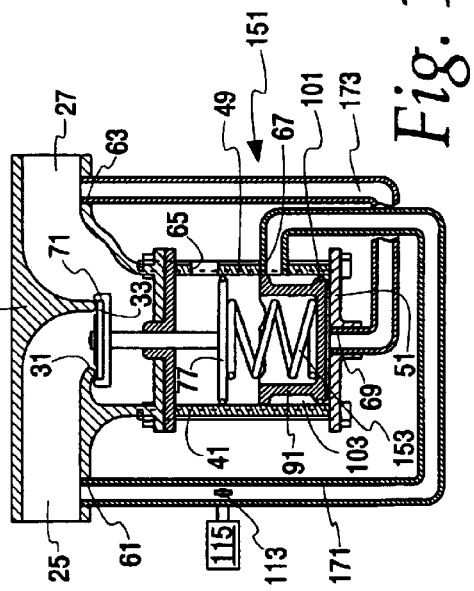
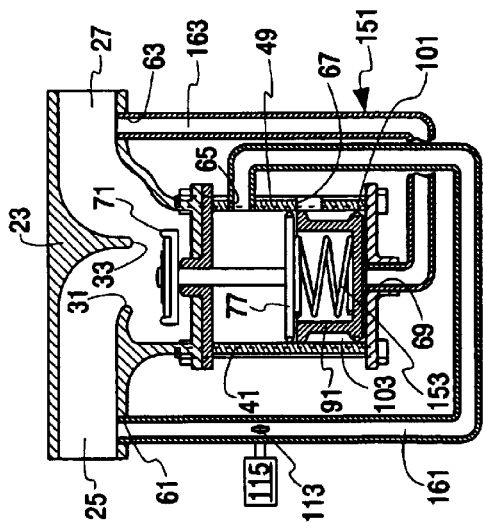

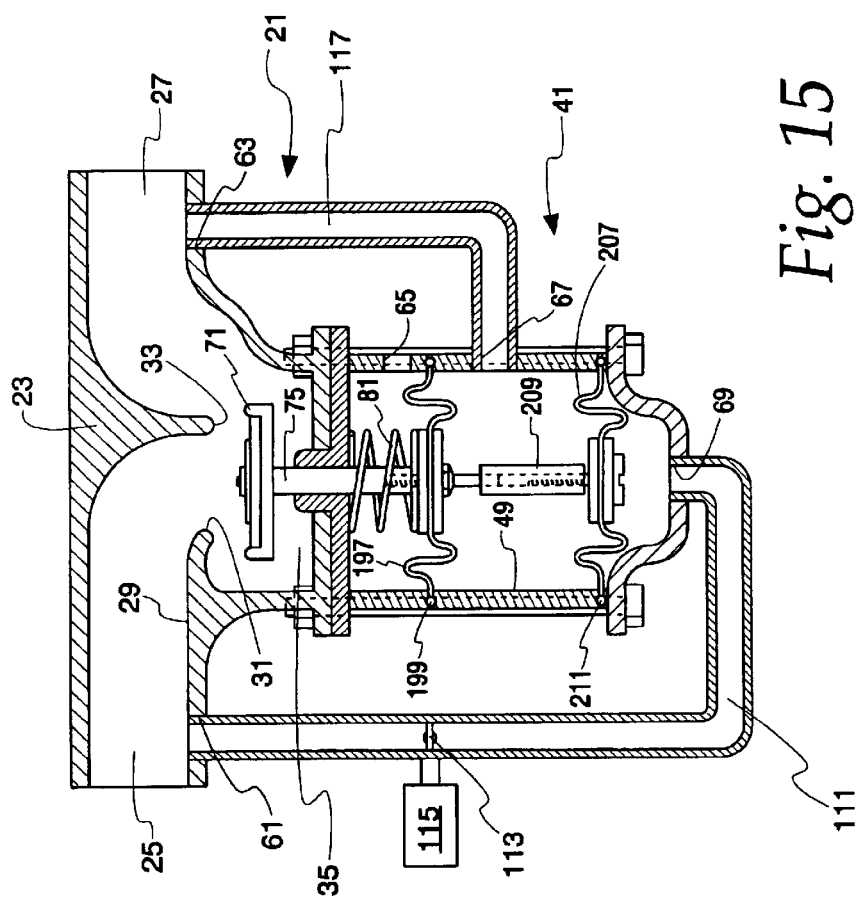

US 6,923,205 B2

PRESSURE REGULATOR AND SHUT-OFF VALVE

RELATED APPLICATION

This is a division and continuation-in-part of application Ser. No. 10/284,719 now U.S. Pat No. 6,752,169 filed Oct. 31, 2002, in the name of Robert E. Callies and titled "Pressure Regulator and Shut-Off Valve."

BACKGROUND OF THE INVENTION

This invention relates to a fluid flow control device that combines the functions of pressure regulation and selectable flow control. That is, the device regulates the pressure at the outlet to a predetermined value and it responds to a suitable control signal to permit or prevent fluid flow. The device will be referred to herein as a regulator valve. The device is particularly suitable for use in irrigation applications, although it is not limited to this use.

Agricultural irrigation systems typically have a main pipeline and multiple secondary and tertiary distribution lines branching therefrom. Water (with or without added fertilizer, herbicide, insecticide etc.) is supplied to the end of the pipeline. Sprinkler heads, branch laterals, or other distribution means are mounted at intervals along the length of the pipeline for distributing the water. The sprinkler heads or other distribution means can be mounted more or less directly to the main pipeline or at some point along the length of branch distribution laterals that supply the water application devices for growing the crops. In either case the flow rate of water through a sprinkler head or other application device is dependent on the hydraulic pressure at the inlet of the device. That pressure can vary along the length of the pipeline due to friction losses in the pipe and undulations in the local terrain. When it is critical to control the flow rate through an application device a pressure regulator is placed between the pipeline and the device to assure a known hydraulic pressure at the device's inlet, regardless of its location along the length of the distribution system or undulations in the local terrain. A typical pressure regulator of this type is shown in U.S. Pat. No. 4,543,985.

In some applications it may be also desirable to be able to turn the flow of individual application devices on or off, in addition to controlling the pressure seen by the inlet of the device. Examples where this would be advantageous include a center pivot machine having a swing span pivotably connected to the moving end of the pipeline. The swing span swings into the corners of a field to irrigate portions that would otherwise be missed by the circular pattern covered by the main pipeline. The swing span folds in when the main pipeline is opposite an edge of the field and swings out into a corner. U.S. Pat. Nos. 4,011,990 and 5,695,129 describe such a machine. The main pipeline may stop while the swing span irrigates the corner portion. In that case, it would be desirable to turn off the main pipeline sprinklers. The swing span sprinklers need to be off when the swing span is not irrigating a corner. Another example where on-off control is desirable is where field conditions are known to vary from one location to another and the irrigation machine is programmed to apply water and/or chemicals at differing rates dependent on these known field conditions. A third example of where on-off control is desirable is in an orchard, vineyard, golf course, or other application, where it is desirable to turn on or off only a portion of the distribution devices or branch distribution laterals that supply the water application devices connected to a supply system.

My prior combined pressure regulator and shut-off valve, which is shown and described in U.S. Pat. No. 6,374,853, incorporates a selectable on-off feature. This prior valve of mine utilizes first and second tubular plungers each connected to first and second flexible diaphragms, respectively. This valve is particularly well suited to installation in the tubular drop that connects a sprinkler head to a main or branch pipeline wherein the valve functions as a normally open valve.

SUMMARY OF THE INVENTION

The present invention is directed to a combined pressure regulator and shut-off valve that can be installed in a main or a branch pipeline utilizing a disk valve or similar device and an annular seat. The pressure regulating and shut-off mechanisms for the valve are installed in a separate control housing which may be attached to the pipeline shut-off valve housing by a threaded connection, tie bolts or other suitable means of retention. Alternately the control housing could be integrally molded with the valve. A balancing pressure piston located in the control housing is fixedly connected to the disk valve by a rod or a stem. A shut-off piston is movable freely in the control housing relative to the balancing pressure piston attached to the rod. The shut-off piston is equipped with a standoff which engages the balancing pressure piston to maintain a chamber of a minimum length between the two pistons.

In a preferred embodiment of the invention, a compression spring is installed between the balancing pressure piston and the shut-off piston to enable the valve to function as a "normally closed" valve. The use of a shut-off piston which moves relative to the balancing pressure piston in a chamber of a minimum length between the pistons allows the placement of ports in the control housing to permit the shut-off pressure and regulating pressure conduits to be connected to the various ports in different arrangements to obtain varying operating functions for the combined pressure regulating and shut-off valve. The shut-off or pilot pressure is usually controlled by a solenoid operated valve or similar device which may be of the self-bleeding type to relieve pressure in the shut-off pressure conduit when the solenoid operated valve is closed while the regulating conduit is usually unobstructed.

BRIEF DESCRIPTION OF THE DRAWINGS

The invention is illustrated more or less diagrammatically in the following drawings wherein:

FIG. 1 is a cross sectional view taken through one embodiment of the valve of this invention shown in its open pressure regulator condition;

FIG. 2 is a view similar to FIG. 1 but showing the valve in a shut-off condition;

FIG. 3 is a cross sectional view of another embodiment of the invention showing the valve in its open pressure regulating condition;

FIG. 4 is a view similar to a view of the valve of FIG. 3 but showing the valve in its shut-off position;

FIG. 5 is a cross sectional view of a third embodiment of the valve of this invention showing the valve in its normally closed position;

FIG. 6 is a view of the embodiment of the valve of FIG. 5 but shown in a fully open position;

FIG. 7 is a similar view of the valve of FIG. 5 but showing the valve in its open pressure regulating position;

FIG. 8 is a cross sectional view of a fourth embodiment of the valve of this invention showing the valve in its normally closed position;

FIG. 9 is a view of the valve of FIG. 8 shown in its fully open position;

FIG. 10 is a view of the embodiment of the valve of FIG. 8 but shown in its open pressure regulating position;

FIG. 11 is a cross sectional view of a fifth embodiment of the valve of the invention shown in its normally closed position;

FIG. 15 is a cross-sectional view of a seventh embodiment of the valve of this invention showing the valve in its open pressure regulating condition;

DETAILED DESCRIPTION OF THE INVENTION

Figure 12:
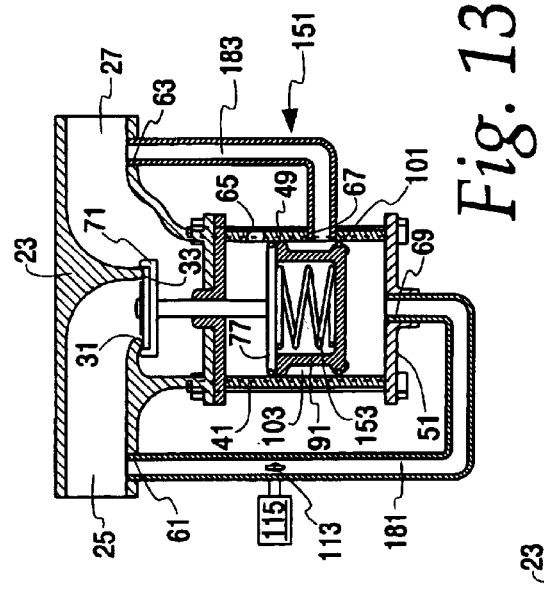
FIG. 12 is a cross sectional view of a sixth embodiment of the invention showing the valve in its normally closed position.

The regulator valve 21 of this invention is shown generally in FIG. 1 of the drawings. It includes a housing 23 having an inlet passage 25 and an outlet passage 27. The valve can be installed in a main or branch pipeline of an agricultural irrigation system or may be installed in the supply line that connects a sprinkler head or other application device to such a main or branch pipeline. The inlet and outlet passages are separated by a partition 29 in which there is a water flow opening or passage 31. As is conventional, an annular seat 33 surrounds the opening. This seat may be formed as part of the valve housing 23 or may be a removable and replaceable seat of the type commonly known in the plumbing industry. The passage 31 defines an upstream side and a downstream side of the pipeline. The upstream side is that portion from the passage 31 toward the inlet 25 and includes the pipeline (not shown) attached to valve housing at the inlet passage as well as the inlet passage itself. The downstream side is that portion from the passage 31 toward the outlet 27 and includes the pipeline (not shown) attached to the valve housing at the outlet passage as well as the outlet passage itself. A chamber 35 is located between the water flow opening 31 and the outlet passage 27. A wall 37 is formed at what can be called the bottom of the chamber 35 in accordance with the orientation shown in FIG. 1 of the drawings but it should be appreciated that this orientation is for ease of description and the valve housing 23 can be oriented in other directions. A small passage or opening 39 is formed in the wall 37 of the housing 23. The wall 37 may be omitted and the top wall of the control housing, to be hereinafter explained, may function to close the bottom of the chamber 35.

A control housing 41, which is generally cylindrical in shape, has a generally circular top wall 43 which fits against the bottom of the housing 23. A collar 45 formed as part of the top wall 43 extends into the opening 39 in the housing 23. The control housing has a tubular wall 49 which is preferably cylindrical in shape and an end or bottom wall 51 which is located oppositely to the wall 43. The control housing is shown to be supported on the valve housing by tie bolts and nuts 55 although other fastening arrangements may be used.

A port 61 is formed in the housing 23 leading into the inlet passage 25. A port 63 is formed in the housing 23 leading into the outlet passage 27. Two ports are formed in the tubular wall 49 of the control housing 41. One of these, which is closer to the top wall 43, is designated as the upper port 65 and the other port 67, which is located closer to the bottom wall 51 of the control housing, is designated the lower port 67. A third port 69 is formed in the bottom wall 51 of the control chamber.

Although various manners of controlling water flow through the opening 31 may be utilized, for illustrative purposes a disk valve is shown. The disk valve 71 is located in the chamber 35 of the housing 23 and it has a compressible seal 73 which can be moved into and out of water sealing contact with the annular seat 33 of the housing. The disk valve is affixed to a stem 75 which extends through the opening 47 in the collar 45 of the control housing top wall 43 and into the control housing 41. A disk-shaped piston 77 is affixed to the other end of the stem 75 and an annular seal such as an O-ring 79 is mounted on the periphery of the piston to engage the tubular wall 49 of the control housing. It should be understood that a piston is only one form of a partition that may be used to sub-divide the control housing 41 to isolate the ports from one another. A compression spring 81 is positioned between the top wall 43 of the control housing 41 and the piston 77 of the disk valve to bias the disk valve 71 out of contact with the annular seat 33 of the housing 23.

A cup-shaped piston 91 having a tubular wall 93 surrounding a cavity 95 is located in the control housing 41 between the piston 77 of the disk valve and the bottom wall 51 of the control housing 41. The tubular wall has an open end 97 positioned adjacent the valve piston 77 and a base end wall 99 positioned against the bottom wall 51 of the control housing. An annular-shaped seal 101 is located on the outer periphery of the base end wall 99 and engages the tubular wall 49 of the control housing. The tubular wall 93 of the cup-shaped piston is smaller in diameter than its base end wall 99 to provide an annular space 103 between the cup-shaped piston and the tubular wall 49. Scallops 105 are formed at the open end 97 of the piston to allow water flow into and out of the cavity 95 from the annular space 103. It should be understood that the tubular wall 93 of the piston 91 could be replaced by a projection such as a post or spacers of other types (not shown) that would engage the piston 77 of the disk valve 71 to define a minimum space between the piston 77 and the annular seal 101 formed on the base wall 99 of piston 91. It should also be understood that this minimum spacing between the pistons prevents the seals on the pistons from compromising the function of port 67. However, an advantage of the cup-shaped piston is that it prevents undesirable tilting of the cup-shaped piston in the control housing 41.

A conduit 111 connects the port 61 of inlet passage 25 to the port 69 located in the bottom wall 51 of the control housing 41. Flow in this conduit is controlled by a valve 113 operated by a solenoid 115. Valve 113 may also include a bleeder (not shown). A conduit 117 connects the port 63 of the outlet passage 27 of the valve housing 23 with the port 67 located in the tubular wall 49 of the control housing 41. It should be noted that in FIG. 1 the conduit control valve 113 is shown in its closed position. Any pressure in the portion of conduit 111 between valve 113 and port 69 has been bled off. The conduit 117 is unobstructed. The disk valve 71 is moved to its open position by the biasing force of the compression spring 81 while any fluid pressure in the outlet passage 27 is acting through the conduit 117 against the under surface of the piston 77 to provide a balance between the water pressure in the inlet passage 25 and the reduced pressure in the outlet passage 27 thereby regulating the flow of water through the passage 31.

FIG. 2 of the drawings shows the regulator valve 21 of FIG. 1 but in its closed position. Closing of the disk valve 71 against the annular seat 33 of the passage 31 of the valve housing 23 was accomplished by opening valve 113 in the inlet passage conduit 111. This introduces water under inlet pressure to the underside of the annular seal 101 on the base end wall 99 of the cup-shaped piston 91. The water under inlet pressure moves the open end 97 of the cup-shaped piston against the piston 77 connected to the stem 75 of the disk valve 71 compressing spring 81 and moving disk valve 71 to its water passage 31 closing position. It should be noted that in the closed position of the valve shown in FIG. 2 the annular seal 101 of the cup-shaped piston 91 separates the pressure introduced into the control housing by the conduit 111 from the port 67 in the tubular wall 49 of the control housing to prevent flow of the pressurized water into the outlet passage 27 of the valve housing. Also, the annular seal 79 of the piston 77 attached to the stem 75 of the disk valve is positioned below the port 65 in the cylindrical wall 49 of the control housing to prevent any leakage through this port which functions in this embodiment of the invention as a vent.

The regulator valve 21 shown in the embodiment of FIGS. 3 and 4 of the drawings is identical in construction to valve 21 shown in FIGS. 1 and 2 except that the connections of the inlet passage conduit and outlet passage conduit to the ports of the control housing 41 are rearranged. In the modification of FIGS. 3 and 4, an inlet passage conduit 131 connects the port 61 of the inlet passage 25 of the housing 23 to the port 67, which is the lower port in the cylindrical wall 49 of the control housing. An outlet passage conduit 133 connects the port 63 in the outlet passage 27 of the housing 23 with the port 69 located in the bottom wall 51 of the control housing 41.

In FIG. 3 of the drawings, the valve 21 is shown in its normally open or regulating position. The valve 113 in conduit 131 leading from the inlet passage 25 of the valve housing 23 is closed with its automatic bleeder opening functioning to relieve pressure in conduit 131 downstream of the valve 113. The compression spring 81 has biased the disk valve 71 to its open position. The spring is bearing against the piston 77 which in turn engages the cup-shaped piston 91 in a position above the bottom wall 51 of the control housing 41. Regulating pressure through the conduit 133 passes through port 69 in the bottom wall 51 of the control housing 41 to act against the underside of cup-shaped piston 91 to hold piston 91 away from bottom wall 51. The regulating pressure acts against the piston 77 and spring 81 regulating flow through the opening 31 in the partition 29 of the valve housing 23 by resisting opening movement of the disk valve 71 caused by flow through the passage 31.

FIG. 4 of the drawings shows the normally open valve 21 in its closed position. In this condition of the regulating valve, the valve 113 in conduit 131 is in its open position admitting water at inlet passage pressure through port 67 where it acts against the piston 77 to move it to an upright position where spring 81 is compressed and disk valve 71 moves into contact with seat 33 to seal the water opening 31 in partition 29 of valve housing 23. The pressure from the water being admitting through port 67 separates the cup-shaped piston 91 from the disk-shaped piston 77 and bottoms it in the control housing 41. The annular seal 101 on the cup-shaped piston 99 prevents inlet passage water from entering the conduit 133 connected to the outlet passage 27 at port 63.

A modified regulator valve 151 is depicted in FIGS. 5–14 of the drawings. FIGS. 8–14 show the identical valve as is shown in FIGS. 5–7 but also depicts various modifications of the conduit connections between the inlet and outlet passages and the ports in the control housing. Because essentially the same parts are found in regulator valve 21, previously described, and in modified regulator valve 151, similar parts will be identified by the same numbers in the following description except in situations where the construction, relative placement of a part or its function has changed such that clarity in describing the construction, relative location or function of the part will be enhanced by assigning a different number to it.

FIGS. 5–7 of the drawings show a first embodiment of the modified regulator valve 151. This valve is almost identical to the previously described valve 21 except that a compression spring 153 seats in the cup-shaped piston 91 and engages the piston 77 to bias the disk valve 71 to its closed position shown in FIG. 5 of the drawings. In this embodiment of the modified regulator valve 151, a conduit 155 connects at one end to the port 61 of the inlet passage 25 and to the port 65 in the cylindrical wall 49 of the control housing 41 at its other end. A conduit 157 connects the port 63 of the outlet passage 27 to the lower port 67 in the cylindrical wall 49 of the control housing 41. As shown in FIG. 5, the regulator valve 151 is in its closed position with the compression spring 153 extended to engage the piston 77 and force the disk valve 71 into contact with the annular seat 33 of the opening 31 in the valve housing 23. There is no fluid pressure acting on the piston 77 or the cup-shaped piston 91 because the valve 113 is in its closed position set by the solenoid 115 and there is no pressure in the outlet passage 27 of the valve housing 23.

FIG. 6 of the drawings shows the regulator valve 151 in its fully open position. This is accomplished by the solenoid moving the valve 113 to its open position allowing fluid pressure in inlet passage 25 to flow through the conduit 155 to the port 65 in the cylindrical wall 49 of the control housing 41. The fluid pressure acts against the piston 77 compressing spring 153 and moving the disk valve 71 to its fully open position allowing fluid flow through the opening 31 in the partition 29 and into the outlet passage 27. Pressure from the inlet pressure conduit 155 forces the piston 77 against spring 153 to compress it and to seat the cup-shaped piston 91 against the bottom wall 51 of the control housing 41.

FIG. 7 shows the regulator valve 151 in its open regulating condition. This is achieved by closing the valve 113 controlled by the solenoid 115 while the valve 151 is in its fully open position as shown in FIG. 6 of the drawings. With the valve 113 in the inlet passage conduit 155 closed, pressure is automatically bled from the conduit allowing the compressed spring 153 to act on the disk valve piston 77 to move it toward the annular seat 33. However, the downstream pressure acting through the outlet pressure conduit 157 enters the control housing 41 through the port 67 acting on the underside of the piston 77 and assisting the compression spring 153 to force the disk valve against the inlet pressure of the fluid passing through the annular seat 33 to reach a balanced or equilibrium condition as shown in FIG. 7.

The regulator valve 151, shown in the embodiment of FIGS. 8, 9 and 10 of the drawings, is identical in construction to valve 151 shown in FIGS. 5, 6 and 7 except that the connections of the inlet passage conduit and outlet passage conduit to the ports of the control housing 41 are rearranged. In the modification of FIGS. 8, 9 and 10, an inlet passage conduit 161 connects the port 61 of inlet passage 25 with the port 65 formed in the cylindrical wall 49 of the control housing 41. An outlet passage conduit 163 connects the port 63 in the outlet passage 27 to the port 69 in the bottom wall 51 of the control housing 41. FIG. 8 of the drawings shows the control valve in its normally closed position. The valve 113 in the inlet pressure conduit 161 is in its closed position and bleeds pressure from the conduit. The compression spring 153 acting on the piston 77 moves the disk valve 71 into engagement with the annular seat 33 to close the opening 31 between the inlet passage 25 and the outlet passage 27. Also, as influenced by this spring 153, the cup-shaped piston 91 is moved into engagement with the bottom wall 51 of the control housing 41.

The fully open position of control valve 151 of FIG. 8 is shown in FIG. 9. The disk valve 71 is moved to its fully opened position by opening the valve 113 in the conduit 161 leading from the inlet passage 25 of the valve 23 by actuating the solenoid 115. The pressure from the inlet passage conduit 161 is directed through port 65 into the control housing 41 where it forces the piston 77 against the spring 153 to compress the spring and move the cup-shaped piston 91 into contact with the bottom wall 51 of the control housing 41.

To change the condition of the control valve 151 to its open regulating position shown in FIG. 10 of the drawings, the solenoid 115 is actuated to close the valve 113 in the inlet passage conduit 161. Closing of the valve 113 allows the bleeding of pressure in conduit 161 permitting the compressed spring 153 to move the piston 77 and the disk valve 71 towards the annular seat 33 around the opening 31 connecting inlet passage 25 and outlet passage 27. As the valve 71 throttles water flow through the opening 31, downstream pressure in outlet passage 27 passes through conduit 163 and through port 69 in the bottom wall 51 of the control housing 41 to move the cup-shaped piston 91 upwardly away from end wall 51 and assist spring 153 in biasing disk valve 71 toward its closed position. The throttling effect of the valve 71 produces an equilibrium condition as shown in FIG. 10 of the drawings whereby the outlet pressure in outlet passage 27 is maintained at a desired level.

The regulator valve shown in FIG. 11 of the drawings is identical to the control valve 151, previously described, except that the connections of the inlet passage conduit and the outlet passage conduit to the ports of the control housing 41 are rearranged. In the modification of FIG. 11, an inlet passage conduit 171 connects the port 61 of inlet passage 25 to the lower port 67 in the cylindrical wall 49 of the control housing 41. An outlet passage conduit 173 connects the outlet passage port 63 to the port 69 located in the bottom wall 51 of the control housing 41.

Valve 151 is shown in its closed position in FIG. 11 with the disk valve 71 engaging the annular seat 33 to prevent flow from the inlet passage 25 to the outlet passage 27 of the housing 23. Inlet pressure passes through the inlet passage conduit 171 into the control housing 41 through port 67 and through the annular space 103 to act against piston 77 to force it into contact with the seat 33 because the valve 113 is in the open position as actuated by the solenoid 115. In this arrangement, the inlet pressure supplements the bias of the compression spring 153 to maintain the disk valve 71 in its closed position. The cup-shaped piston 91 is forced into contact with the bottom wall 51 of the control housing 41 and through its annular seal 101 shuts off any fluid to the outlet passage conduit 173.

Figure 14:
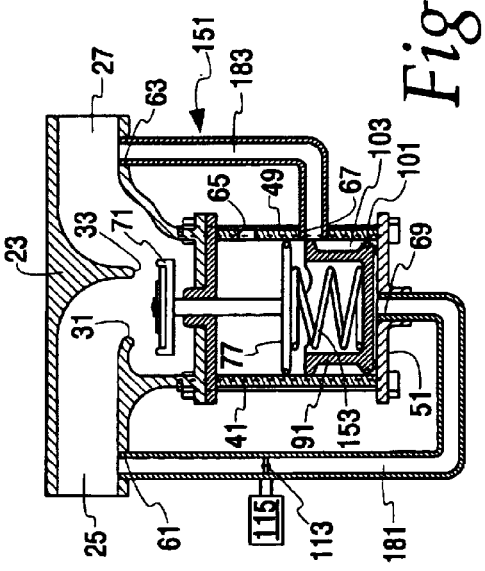
FIG. 14 is a cross sectional view of the valve of the embodiment of FIG. 12 shown in its open pressure regulating position.
Figure 13:
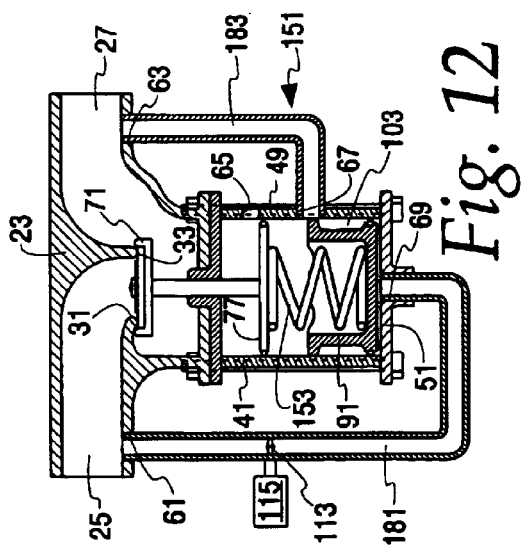
FIG. 13 is a view of the valve of FIG. 12 shown in a pressurized, closed condition.

The regulator valve 151, shown in FIGS. 12, 13 and 14 of the drawings, is identical in construction to the valve 151 shown in FIGS. 5, 6 and 7 of the drawings except that the connections of the inlet passage conduit and the outlet passage conduit to the ports of the control housing 41 are rearranged. In the modification of FIGS. 12, 13 and 14, an inlet passage conduit 181 connects the port 61 of the inlet passage 25 of the housing 23 to the port 69 in the bottom wall 51 of the control housing 41. An outlet passage conduit 183 connects the port 63 in the outlet passage 27 with the lower port 67 in the cylindrical wall 49 of the control housing 41.

In FIG. 12 of the drawings, the regulator valve 151 is shown in its closed position in which the disk valve 71 engages the annular seat 33 surrounding the opening 31 between the inlet passage 25 and the outlet passage 27. The valve 113 is in its normally closed position as controlled by the solenoid 115 and the inlet passage conduit 181 downstream of valve 113 is bled free of fluid. In this condition, the compression spring 153 acts against the piston 77 biasing the disk valve 71 into its seated position. The spring 153 also forces the cup-shaped piston 91 to its position in which it is seated against the bottom wall 51 of the control housing 41. In this condition, the disk valve 71 is held in its closed position strictly by the spring 153.

FIG. 13 of the drawings shows the valve 151 in a position in which the disk valve 71 is held in its closed position against the annular seat 33 by the spring 153 and by upstream pressure diverted from the inlet passage 25. The solenoid 115 is actuated to open its valve 113 allowing fluid under pressure from the inlet passage 25 into conduit 181 and through port 69 in the bottom wall 51 of the control housing 41. The fluid acts on the underside of the cup-shaped piston 91 which is sealed by O-ring 101 to move the cup-shaped piston 91 and the compression spring 153 against the piston 77 holding it in its closed position. The O-ring seal 101 on cup-shaped piston 91 seals off port 67 in the cylindrical wall 49 of the control housing 41 to prevent the escape of fluid through the outlet pressure conduit 183.

FIG. 14 of the drawings shows the valve 151 in its fluid flow regulating position. Valve 113 is closed by its solenoid 115 and pressure is drained from the inlet pressure conduit 181 allowing the compression spring 153 and the cup-shaped piston 91 to move towards the base wall 51 of the control housing 41 due to pressure of inflowing fluid in the inlet passage 25. As the fluid passes through the annular seat 33, its pressure is throttled by the valve 71. The outlet pressure in passage 27 is directed through the outlet passage conduit 183, through the port 67 and into the control housing 41 to act against the piston 77 in conjunction with the spring 153 thus providing a balanced pressure to the disk 71 to maintain it in a position of equilibrium as shown in FIG. 14 of the drawings.

The normally closed valves 151 shown in FIGS. 5–7 and 12–14 can be modified by the inclusion of additional control conduits to provide pressurized closing to the valve of FIGS. 5–7 and pressurized opening to the valve of FIGS. 12–14. For example, in the valve 151 of FIGS. 5–7, an additional control conduit similar to conduit 155 could be connected between inlet passage 25 and port 69. This conduit could be pressurized by opening a valve similar to valve 113 which is actuated by a solenoid similar to solenoid 115. The pressurized fluid in the additional control conduit would act on the underside of the cup-shaped piston 91 in control housing 41 to move the piston 91 and compression spring 153 against piston 77 to force valve 71 to its closed position.

The provision of an additional control conduit to valve 151 of FIGS. 12–14 will provide a pressure opening capability to this valve. This can be accomplished by connecting a conduit similar to conduit 181 between inlet passage 25 and the port 65. This conduit can be pressurized by opening a valve similar to valve 113 operated by a solenoid similar to solenoid 115. The pressurized fluid in the control conduit will introduce fluid under pressure into the control housing 41 to act on the upper surface of piston 77 to compress spring 153 and force the cup-shaped piston 91 to the bottom of the control housing 41 so that the valve 71 is in its fully open position.

The regulator valve shown in FIG. 15 is identical in construction to the valve 21 shown in FIGS. 1 and 2 except that the piston 77 and the cup-shaped piston 91 shown in the embodiment of FIGS. 1 and 2 are replaced by flexible partitions such as diaphragms which provide fluid tight sealing with the wall of the control chamber 41 to isolate the ports 65, 67 and 69 from one another. As a replacement for the piston 77, a flexible diaphragm 197 is attached to the end of the stem 75 of the valve 71. A bead 199 formed as the peripheral edge of the diaphragm is anchored in the tubular wall 49 of the control housing 41. The cup-shaped piston 91 formed in the valve shown in FIGS. 1 and 2 is replaced by a flexible diaphragm 207 and a guide rod mechanism 209. The rod mechanism 209 functions as a spacer replacing the tubular wall 93 of the previous piston 91 to maintain the minimum spacing between the diaphragms so as to prevent the diaphragm from compromising the functions of port 67 in the control housing wall. The diaphragm 207 also has a bead 211 at its peripheral edge which is anchored in the tubular wall of the control housing 41.

An additional control conduit similar to conduit 111 can be connected between inlet passage 25 and port 65 of the valve 21 of FIG. 15 to provide the option of pressurized opening of the valve 71. This conduit can be pressurized by opening a valve similar to valve 113 operated by a solenoid similar to solenoid 115. The pressurized fluid in this additional control conduit would introduce fluid under pressure into the control housing 41 to act on the upper surface of the diaphragm 197 to force the diaphragm 197, the spacer rod assembly 209 and the diaphragm 207 in a direction of the bottom of the control housing 41 to move the valve 71 to its fully opened position.

Figure 16:
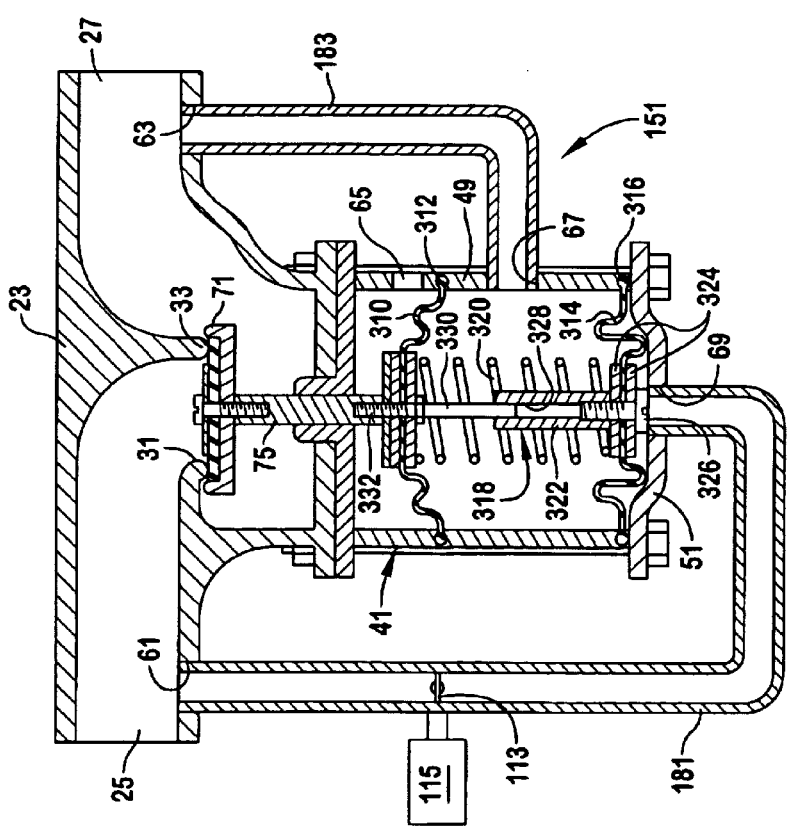
FIG. 16 is a cross-sectional view of an eighth, normally closed embodiment of the valve of the invention showing the valve in its closed condition.

The normally closed regulator valve shown in FIG. 16 is identical in construction to the valve 151 of FIGS. 12–14, except that the piston 77 and the cup-shaped piston 91 shown in the embodiment of FIGS. 12–14 are replaced by flexible partitions such as diaphragms in a manner similar to the embodiment of FIG. 15. As a replacement for piston 77, a flexible diaphragm 310 is attached to the end of stem 75 of valve 71. A bead 312 formed as the peripheral edge of the diaphragm is anchored in tubular wall 49 of housing 41. The cup-shaped piston 91 of FIGS. 12–14 is replaced by a flexible diaphragm 314 that also has a peripheral bead 316 anchored in tubular wall 49. A spacer assembly 318 allows diaphragms 310 and 314 to operate independently of one another but also maintains a minimum spacing therebetween so as to prevent compromising the functions of port 67 in housing wall 49. A coiled compression spring 320 encircles spacer assembly 318 between diaphragms 310 and 314 to yieldably bias the diaphragms away from one another.

Spacer assembly 318 may include an upstanding sleeve 322 that is fixed to a pair of clamping disks 324 on opposite sides of diaphragm 314 at the center thereof. Clamping disks 324 are shown secured to diaphragm 314 by a screw 326, which is shown also utilized to attach sleeve 322 to the disk 324 using an internally threaded portion of sleeve 322. Above the shank of screw 326, sleeve 322 may have a smooth, upright bore 328 that slidably and reciprocably receives an extension 330 protruding from the head of screw 332 which is shown securing diaphragm 310 to valve stem 75 associated with valve 71, such extension also forming part of spacer assembly 318.

FIG. 16 illustrates valve 71 in its closed condition, resiliently held in that position by spring 320. It is to be noted in this respect that the components of valve 151 are so configured and arranged that the head of slotted screw 326 bears against floor 51 of valve housing 41 when piston 71 is in its closed position, thus providing a backstop for spring 320 as it forces diaphragm 310 and piston 71 upwardly toward valve seat 31. An alternate backstop means might be utilized such as a protrusion extending downwardly from clamping disc 324 or upwardly from the bottom wall 51 of the control housing.

When valve 113 is opened, fluid under pressure passes through conduit 181 to port 69 to enter housing 41 and bear against the underside of diaphragm 314. Such action causes diaphragm 314 to flex upwardly, compressing spring 320 more tightly against upper diaphragm 310 and maintaining valve piston 71 against seat 31. When valve 113 is then closed again and pressure within conduit 181 is bled off, compression spring 320 and diaphragm 314 move toward base wall 51 due to pressure of inflowing fluid in inlet passage 25. As the fluid passes through annular seat 33, its pressure is throttled by valve 71. The outlet pressure in passage 27 is directed through outlet passage conduit 183, through port 67 and into control housing 41 to act against diaphragm 310 in conjunction with spring 320 so as to provide a balanced pressure to piston 71 to maintain it in a position of equilibrium.

Figure 17:
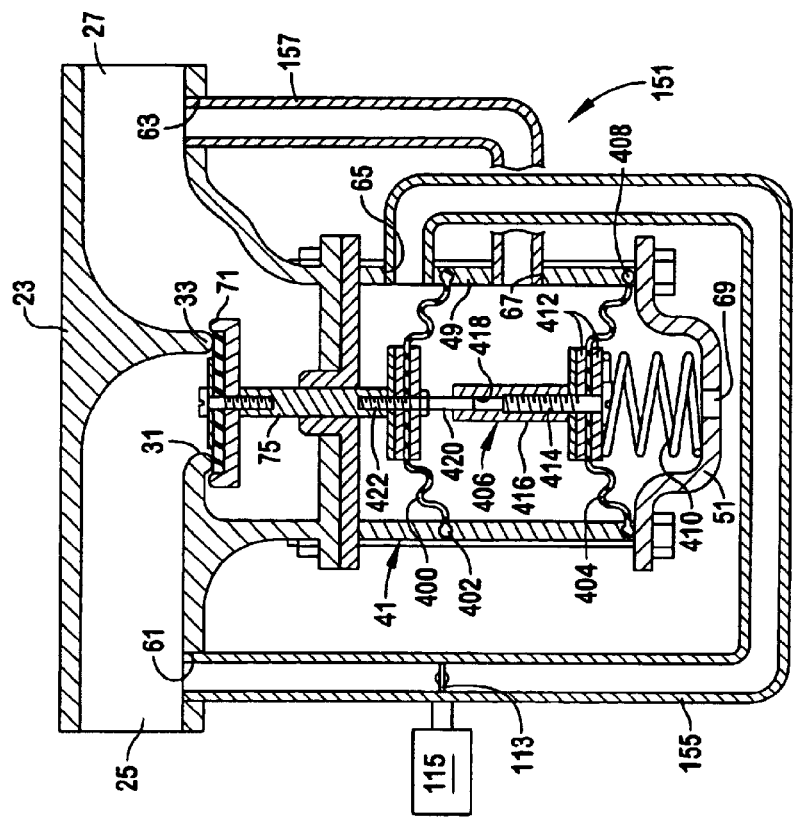
FIG. 17 is a cross-sectional view of a ninth, normally closed embodiment of the valve of the invention showing the valve in its closed condition.

The normally closed regulator valve shown in FIG. 17 is virtually identical to valve 151 of the embodiment disclosed in FIGS. 5, 6 and 7, except that pistons 77 and 91 of that embodiment have been replaced by flexible partitions such as diaphragms. As a replacement for piston 77, a flexible diaphragm 400 is attached to the end of stem 75 of valve piston 71. A bead 402 formed as the peripheral edge of the diaphragm is anchored in tubular wall 49 of housing 41. The cup-shape piston 91 of FIGS. 5, 6 and 7 is replaced by a flexible partition such as a diaphragm 404 and a spacer assembly 406. Like the spacer assembly 318 of the FIG. 16 embodiment, spacer assembly 406 maintains a minimum space between diaphragms 400 and 404 so as to prevent compromising the function of port 67. Diaphragm 404 has a peripheral bead 408 that is anchored in tubular wall 49 of housing 41.

A compression spring 410 is located between bottom wall 51 of housing 41 and the underside of diaphragm 404 for yieldably biasing diaphragm 404 upwardly towards diaphragm 400 and valve seat 31. Spring 410 bears directly against the bottom one of a pair of clamping disks 412 on opposite upper and lower sides of diaphragm 404. Clamping disks 412 are held together by a retaining screw 414 or any other suitable means.

Spacer assembly 406 includes an upstanding sleeve 416 which is shown having an internal bore that is threaded along its lower extent so as to threadably receive the shank of screw 414 and thus securely join sleeve 416 to the diaphragm 404. At its upper end, the internal bore 418 is smooth so as to reciprocably receive an extension 420 protruding from the head of screw 422 which is shown securing diaphragm 400 to valve stem 75. Due to the slidable reception of extension 420 within bore 418, the two diaphragms 400, 404 may move independently of one another, yet minimum spacing therebetween is assured as the upper end of sleeve 416 serves as a limit stop for movement of upper diaphragm 400 toward lower diaphragm 404.

To open the regulator valve of FIG. 17, solenoid 115 is actuated to move valve 113 to its open position, which allows fluid pressure in inlet passage 25 to flow through conduit 155 to port 65. Such pressure acts against diaphragm 400, shifting it downwardly until extension 420 strikes the end of screw 414 or the upper end of sleeve 416 is engaged by the bottom of diaphragm 400, whereupon spring 410 becomes compressed as diaphragm 404 is also shifted downwardly. Fluid flow is thus allowed through opening 31 and into outlet passage 27. Pressure from outlet passage 27 is also communicated to the top side of diaphragm 404 by conduit 157 through ports 63 and 67, thus assisting in compression of spring 410 to maintain valve piston 71 in its fully open position.

To place piston valve 71 in its regulating condition, valve 113 is closed by solenoid 115 while piston valve 71 is in its open position. With valve 113 in its closed position, pressure is automatically bled from conduit 155, allowing the compressed spring 410 to act on diaphragm 404 and shift it toward diaphragm 400. If spacer assembly 406 is bottomed out against diaphragm 400, such movement of diaphragm 404 by spring 410 will also result in corresponding movement of diaphragm 400 and hence valve piston 71 toward seat 31 to a certain extent. However, downstream pressure acting through outlet pressure conduit 157 enters control housing 41 through port 67 and acts on the underside of diaphragm 400 and the top side of diaphragm 404 to assist in reaching a balanced or equilibrium condition in which the valve piston 71 remains spaced a certain distance from seat 31.

While a preferred form of the invention has been shown and described, it will be realized that alterations and modifications may be made thereto without departing from the scope of the following claims. For example, while the conduits are shown connecting to ports in the inlet and outlet passages of the valve housing, these conduits could be connected to points remote from the valve body itself. That is, the conduit could be connected to the main pipeline upstream and downstream of the valve body so long as the pressure flowing into the inlet passage is provided to one conduit and the pressure at the outlet passage is supplied to the other conduit. Furthermore, it will be understood that the extender or spacer shown as cup-shaped member could be otherwise configured to prevent it from tilting in the control housing. The spacer, whether cup-shaped or otherwise could be associated with the rod piston or with the rod itself.

What is claimed is:

1. A regulator valve for use in a pipeline to control the pressure of fluid flowing in the pipeline and to selectively stop the flow of said fluid, the regulator valve comprising:
   a valve housing having an inlet passage and an outlet passage separated by a partition with a flow passage formed in the partition, the flow passage defining an upstream side and a downstream side of the pipeline;
   a seat surrounding the flow passage;
   a valve member movable toward and away from fluid sealing contact with the seat;
   a control housing located adjacent the valve housing;
   a rod connected at one end to the valve member and having an opposite end extending into the control housing;
   a rod partition connected to the opposite end of the rod, at least a portion of the rod partition adjacent the valve rod being movable with the valve rod toward and away from the seat, the rod partition being in fluid sealing relation with the control housing;
   a spring biasing the rod partition and the valve member in a direction toward sealing engagement with the seat;
   an auxiliary partition positioned in the control housing on the side of the rod partition away from the seat, the auxiliary partition being in fluid sealing relation with the control housing;
   a spacer located between the rod partition and the auxiliary partition to maintain a minimum spacing between the rod partition and the auxiliary partition;
   a first port formed in the control housing and located between the rod partition and the auxiliary partition;
   a second port formed in the control housing and located on the side of the auxiliary partition opposite from the rod partition;
   a first conduit connecting the upstream side of the pipeline to the one of the first and second ports to introduce fluid under pressure from the upstream side into the control housing to act against one or both of the auxiliary partition and the rod partition;
   a second conduit connecting the downstream side of the pipeline to the other of the first and second ports to introduce fluid under pressure from the downstream side into the control housing to act against one or both of the auxiliary partition and rod partition; and
   means to control the flow of fluid provided in an least one of the conduits.

2. The regulator valve of claim 1 in which the first conduit connects the upstream side of the pipeline to the second port and the second conduit connects the downstream side of the pipeline to the first port.

3. The regulator valve of claim 2 in which the means to control the flow of fluid is provided in the first conduit.

4. The regulator valve of claim 1 in which the rod partition is a flexible diaphragm.

5. The regulator valve of claim 1 in which the auxiliary partition is a flexible diaphragm.

6. A regulator valve for use in a pipeline to control the pressure of fluid flowing in the pipeline and to selectively stop the flow of said fluid, the regulator valve comprising:
   a valve housing having an inlet passage and an outlet passage separated by a partition with a flow passage formed in the partition, the flow passage defining an upstream side and a downstream side of the pipeline;
   a seat surrounding the flow passage;
   a valve member movable toward and away from fluid sealing contact with the seat;
   a control housing attached to the valve housing;
   a rod connected at one end to the valve member and having an opposite end extending into the control housing;
   a rod partition connected to the opposite end of the rod, at least a portion of the rod partition adjacent the rod being movable with the rod toward and away from the seat, the rod partition being in fluid sealing relation with the control housing;

a spring biasing the rod partition and the valve member in a direction toward sealing engagement with the seat;

an auxiliary partition positioned in the control housing on the side of the rod partition away from the seat, the auxiliary partition being in fluid sealing relation with the control housing;

a spacer engageable with the rod partition to maintain a minimum spacing between the rod partition and the auxiliary partition;

a first port formed in the control housing and located between the rod partition and the auxiliary partition;

a second port formed in the control housing and located on the side of the rod partition opposite from the auxiliary partition;

a first conduit connecting the upstream side of the pipeline to the one of the first and second ports to introduce fluid under pressure from the upstream side into the control housing to act against one or both of the auxiliary partition and the rod partition;

a second conduit connecting the downstream side of the pipeline to the other of the first and second ports to introduce fluid under pressure from the downstream side into the control housing to act against one or both of the auxiliary partition and rod partition; and means to control the flow of fluid provided in at least one of the conduits.

7. The regulator valve of claim 6 in which the spring biasing the rod partition engages the auxiliary partition.

8. The regulator valve of claim 6 in which the first conduit connects the upstream side of the pipeline to the second port and the second conduit connects the downstream side of the pipeline to the first port.

9. The regulator valve of claim 8 in which the means to control the flow of fluid is provided in the first conduit.

10. The regulator valve of claim 6 in which the spacer is cup-shaped and opens toward the rod piston.

11. The regulator valve of claim 10 in which an annular passage is formed between the cup-shaped spacer and the control housing and openings in the cup-shaped spacer connect the annular passage and the open end of the spacer.

12. The regulator valve of claim 6 in which the rod partition is a flexible diaphragm.

13. The regulator valve of claim 6 in which the rod partition is a piston.

14. The regulator valve of claim 6 in which the auxiliary partition is a flexible diaphragm.

15. The regulator valve of claim 6 in which the auxiliary partition is a piston.

16. A regulator valve for use in a pipeline to control the pressure of fluid flowing in the pipeline and to selectively stop the flow of said fluid, the regulator valve comprising:

a valve housing having an inlet passage and an outlet passage separated by a partition with a flow passage formed in the partition, the flow passage defining an upstream side and a downstream side of the pipeline;

a seat surrounding the flow passage;

a valve member movable toward and away from fluid sealing contact with the seat;

a control housing attached to the valve housing;

a rod connected at one end to the valve member and having an opposite end extending into the control housing;

a rod piston connected to the opposite end of the rod and movable in the control housing in sealing engagement therewith;

a spring biasing the rod piston and the valve member in a direction toward sealing engagement with the seat;

an auxiliary piston positioned in the control housing on the side of the rod piston away from the seat;

an extender formed on the auxiliary piston and engageable with the rod piston to maintain a minimum spacing between the rod piston and the auxiliary piston;

a first port formed in the control housing and located on the side of the auxiliary piston opposite from the rod piston;

a second port formed in the control housing and located on the side of the rod piston opposite the auxiliary piston;

a first conduit connecting the upstream side of the pipeline to the one of the first and second ports to introduce fluid under pressure from the upstream side into the control housing to act against one or both of the auxiliary piston and the rod partition;

a second conduit connecting the downstream side of the pipeline to the other of the first and second ports to introduce fluid under pressure from the downstream side into the control housing to act against one or both of the auxiliary piston and rod partition; and means to control the flow of fluid provided in an least one of the conduits.

17. The regulator valve of claim 16 in which the spring biasing the rod piston engages the auxiliary piston.

18. The regulator valve of claim 16 in which the first conduit connects the upstream side of the pipeline to the second port and the second conduit connects the downstream side of the pipeline inlet passage to the first port.

19. The regulator valve of claim 18 in which the means to control the flow of fluid is provided in the first conduit.

20. The regulator valve of claim 16 in which the extender formed on the auxiliary piston is cup-shaped and opens toward the rod piston.

21. The regulator valve of claim 20 in which an annular passage is formed between the cup-shaped extender and the control housing and openings in the cup-shaped extender connect the annular passage and the open end of the cup.

22. A regulator valve for use in a pipeline to control the pressure of fluid flowing in the pipeline and to selectively stop the flow of said fluid, the regulator valve comprising:

a valve housing having an inlet passage and an outlet passage separated by a partition with a flow passage formed in the partition, the flow passage defining an upstream side and a downstream side of the pipeline;

a seat surrounding the flow passage;

a valve member movable toward and away from fluid sealing contact with the seat;

a control housing attached to the valve housing;

a rod connected at one end to the valve member and having an opposite end extending into the control housing;

a rod piston connected to the opposite end of the rod and movable in the control housing in sealing engagement therewith;

a spring biasing the rod piston and the valve member in a direction toward sealing engagement with the seat;

an auxiliary piston positioned in the control housing on the side of the rod piston away from the seat;

an extender formed on the auxiliary piston and engageable with the rod piston to maintain a minimum spacing between the rod piston and the auxiliary piston;

a first port formed in the control housing and located between the rod piston and the auxiliary piston;

a second port formed in the control housing and located on the side of the auxiliary piston away from the rod piston;

a first conduit connecting the upstream side of the pipeline to one of the first and second ports to introduce fluid under pressure from the upstream side into the control housing to act against one or both of the auxiliary piston and the rod partition;

a second conduit connecting the downstream side of the pipeline to the other of the first and second ports to introduce fluid under pressure from the downstream side into the control housing to act against one or both of the auxiliary piston and rod partition; and means to control the flow of fluid provided in at least one of the conduits.

23. The regulator valve of claim 22 in which the spring biasing the rod piston engages the auxiliary piston.

24. The regulator valve of claim 22 in which the first conduit connects the upstream side of the pipeline to the first port and the second conduit connects the downstream side of the pipeline to the second port.

25. The regulator valve of claim 24 in which the means to control the flow of fluid is provided in the first conduit.

26. The regulator valve of claim 22 in which the extender formed on the auxiliary piston is cup-shaped and opens toward the rod piston.

27. The regulator valve of claim 26 in which an annular passage is formed between the cup-shaped extender and the control housing and openings in the cup-shaped extender connect the annular passage and the open end of the cup.

28. A regulator valve for use in a pipeline to control the pressure of fluid flowing in the pipeline and to selectively stop the flow of said fluid, the regulator valve comprising:

a valve housing having an inlet passage and an outlet passage separated by a partition with a flow passage formed in the partition, the flow passage defining an upstream side and a downstream side of the pipeline;

a seat surrounding the flow passage;

a valve member movable toward and away from fluid sealing contact with the seat;

a control housing located adjacent the valve housing;

a rod connected at one end to the valve member and having an opposite end extending into the control housing;

a rod partition connected to the opposite end of the rod, at least a portion of the rod partition adjacent the valve rod being movable with the valve rod toward and away from the seat, the rod partition being in fluid sealing relation with the control housing;

a spring biasing the rod partition and the valve member in a direction toward sealing engagement with the seat;

an auxiliary partition positioned in the control housing on the side of the rod partition away from the seat, the auxiliary partition being in fluid sealing relation with the control housing;

a spacer located between the rod partition and the auxiliary partition to maintain a minimum spacing between the rod partition and the auxiliary partition;

a first conduit coupled in fluid flow relationship with the upstream side of the pipeline;

a second conduit coupled in fluid flow relationship with the downstream side of the pipeline;

first and second ports in the control housing disposed and connected with said first and second conduits in a manner for controlling the positions of the rod partition and the auxiliary partition; and means to control the flow of fluid provided in an least one of the conduits.

* * * * *